(12) United States Patent  (10) Patent No.: US 7,625,652 B2
Uensal et al.  (45) Date of Patent: Dec. 1, 2009

(54) MULTILAYER ELECTROLYTE MEMBRANE

(75) Inventors: Oemer Uensal, Mainz (DE); Joachim Kiefer, Losheim am See (DE)

(73) Assignee: BASF Fuel Cell GmbH, Frankfurt am Main (DE)

( * ) Notice: Subject to any disclaimer, the term of this patent is extended or adjusted under 35 U.S.C. 154(b) by 733 days.

(21) Appl. No.: 10/512,264

(22) PCT Filed: Apr. 22, 2003

(86) PCT No.: PCT/EP03/04117

§ 371 (c)(1),
(2), (4) Date: Dec. 8, 2004

(87) PCT Pub. No.: WO03/092090

PCT Pub. Date: Nov. 6, 2003

(65) Prior Publication Data

US 2005/0181254 A1  Aug. 18, 2005

(30) Foreign Application Priority Data

Apr. 25, 2002 (DE) ................. 102 18 367
Apr. 25, 2002 (DE) ................. 102 18 368

(51) Int. Cl.
*H01M 8/10* (2006.01)

(52) U.S. Cl. ................ 429/33; 429/42; 429/309; 429/314; 521/27

(58) Field of Classification Search ............ 429/33, 429/309, 314, 42; 521/27
See application file for complete search history.

(56) References Cited

U.S. PATENT DOCUMENTS

| 3,224,908 | A |   | 12/1965 | Duch et al. |
| 3,293,088 | A |   | 12/1966 | Herbst et al. |
| 3,313,783 | A |   | 4/1967 | Iwakura et al. |
| 3,737,045 | A |   | 6/1973 | Hasimoto et al. |
| 3,808,305 | A |   | 4/1974 | Gregor |
| 4,012,303 | A |   | 3/1977 | D'Agostino et al. |
| 4,075,093 | A |   | 2/1978 | Walch et al. |
| 4,141,800 | A | * | 2/1979 | Breuer et al. ............ 205/779.5 |
| 4,187,333 | A |   | 2/1980 | Rembaum et al. |
| 4,537,668 | A |   | 8/1985 | Gaussens et al. |
| 4,622,276 | A |   | 11/1986 | Walsh |

(Continued)

FOREIGN PATENT DOCUMENTS

DE    1 301 578    8/1969

(Continued)

OTHER PUBLICATIONS

Osaheni, J.A. and Jenekhe, S.A., "Synethesis of Processing of Heterocyclic Polymers as Electronic, Optoelectronic, and Nonlinear Optical Materials. 4. New Conjugated Rigid-Rod Poly(benzobis(imidazole))s," *Macomolecules* 28:1172-1179 (1995).

(Continued)

*Primary Examiner*—Peter D. Mulcahy
*Assistant Examiner*—Henry Hu
(74) *Attorney, Agent, or Firm*—Hamilton, Brook, Smith & Reynolds, P.C.

(57) ABSTRACT

The present invention relates to a proton-conducting multi-layer electrolyte membrane with a barrier layer, a process for producing it and a fuel cell containing such a membrane.

16 Claims, 3 Drawing Sheets

U.S. PATENT DOCUMENTS

| | | |
|---|---|---|
| 4,634,530 A | 1/1987 | Kuder et al. |
| 5,098,985 A | 3/1992 | Harris et al. |
| 5,211,984 A | 5/1993 | Wilson |
| 5,218,076 A | 6/1993 | Madison et al. |
| 5,312,895 A | 5/1994 | Dang et al. |
| 5,492,996 A | 2/1996 | Dang et al. |
| 5,525,436 A * | 6/1996 | Savinell et al. ............... 429/30 |
| 5,599,639 A | 2/1997 | Neoya et al. |
| 5,633,337 A | 5/1997 | Tan et al. |
| 5,643,968 A | 7/1997 | Andreola et al. |
| 5,656,386 A | 8/1997 | Scherer et al. |
| 5,674,969 A | 10/1997 | Sikkema et al. |
| 5,939,220 A * | 8/1999 | Gunner et al. ................ 429/40 |
| 5,981,097 A * | 11/1999 | Rajendran .................... 429/33 |
| 6,030,718 A | 2/2000 | Fuglevand et al. |
| 6,087,032 A | 7/2000 | Yoshitake et al. |
| 6,096,369 A | 8/2000 | Anders et al. |
| 6,110,616 A | 8/2000 | Sheikh-Ali et al. |
| 6,197,147 B1 | 3/2001 | Bönsel et al. |
| 6,248,469 B1 | 6/2001 | Formato et al. |
| 6,368,587 B1 | 4/2002 | Anders et al. |
| 6,869,980 B2 * | 3/2005 | Cui ............................. 521/27 |
| 7,235,320 B2 * | 6/2007 | Calundann et al. ........... 429/30 |
| 2001/0038937 A1 | 11/2001 | Suzuki et al. |
| 2002/0045085 A1 | 4/2002 | Formato et al. |
| 2004/0101731 A1 | 5/2004 | Jakoby et al. |
| 2004/0241519 A1 * | 12/2004 | Howard ...................... 429/33 |

FOREIGN PATENT DOCUMENTS

| | | |
|---|---|---|
| DE | 196 53 484 A1 | 6/1998 |
| DE | 101 48 131 A1 | 5/2003 |
| EP | 0 265 921 A2 | 5/1988 |
| EP | 0 265 921 A3 | 5/1988 |
| EP | 0 476 560 A1 | 3/1992 |
| EP | 0 846 733 A2 | 6/1998 |
| EP | 0 893 165 A2 | 1/1999 |
| EP | 1 110 992 A1 | 6/2001 |
| EP | 1 202 365 A1 | 5/2002 |
| EP | 1354907 A1 | 10/2003 |
| JP | 53-97988 | 8/1978 |
| JP | 2002146014 | 5/2002 |
| JP | 2003022709 | 1/2003 |
| WO | WO 94/25506 | 11/1994 |
| WO | WO 99/10165 | 3/1999 |
| WO | WO 00/49069 | 8/2000 |
| WO | WO 00/54351 | 9/2000 |
| WO | WO 01/45192 A1 | 6/2001 |
| WO | WO 01/94450 A2 | 12/2001 |
| WO | WO 02/36249 A1 | 5/2002 |
| WO | WO 02/38650 A1 | 5/2002 |
| WO | WO 02/071518 A1 | 9/2002 |
| WO | WO 02/081547 A1 | 10/2002 |
| WO | WO 02/088219 A1 | 11/2002 |
| WO | WO 02/102881 A1 | 12/2002 |
| WO | WO 03/007411 A2 | 1/2003 |
| WO | WO 03/022412 A2 | 3/2003 |
| WO | WO 03/022412 A3 | 3/2003 |
| WO | WO-03/092090 A2 * | 11/2003 |

OTHER PUBLICATIONS

Polymeric Materials Science and Engineering, Y. Sakaguchi et al., vol 84, 2001, p. 899-900.

* cited by examiner

Experimental set-up for measuring the barrier action of a cation-exchange membrane for membranes doped with phosphoric acid pH change of cation-exchange membranes Change in the pH when using cation-exchange membranes as barrier layer after correction of the blank measurement Measurement of the amount of acid which has passed through the barrier layer and that which has been retained by the barrier layer

MULTILAYER ELECTROLYTE MEMBRANE

RELATED APPLICATIONS

This application is the U.S. National Stage of International Application No. PCT/EP03/04117, filed Apr. 22, 2003, published in German, and claims priority under 35 U.S.C. § 119 or 365 to Germany Application Nos. 102 18 368.6 and 102 18 367.8, both filed on Apr. 25, 2002.

DESCRIPTION

The present invention relates to a proton-conducting multilayer electrolyte membrane, a process for producing it and a fuel cell containing such a membrane.

A fuel cell usually comprises an electrolyte and two electrodes separated by the electrolyte. In the case of a fuel cell, a fuel such as hydrogen gas is supplied to one of the two electrodes and an oxidant such as oxygen gas is supplied to the other electrode and chemical energy from the oxidation of the fuel is in this way converted into electric energy.

The electrolyte is permeable to hydrogen ions, i.e. protons, but not to reactive gases such as the hydrogen gas and the oxygen gas.

A fuel cell generally has a plurality of single cells known as MEUs (membrane-electrode units) which each comprise an electrolyte and two electrodes separated by the electrolyte.

Electrolytes employed for the fuel cell are solids such as polymer electrolyte membranes or liquids such as phosphoric acid. In recent times, polymer electrolyte membranes have attracted attention as electrolytes for fuel cells. An in-principle distinction can be made between 2 categories of polymer membranes. The first category comprises cation-exchange membranes composed of a polymer framework containing covalently bound acid groups, preferably sulphonic acid groups. The sulphonic acid group is converted into an anion by release of a hydrogen ion and therefore conducts protons. The mobility of the proton and thus the proton conductivity is directly related to the water content. If the membrane dries out, e.g. as a result of high temperature, the conductivity of the membrane and consequently the power of the fuel cell decreases drastically. The operating temperature of fuel cells containing such cation-exchange membranes is thus limited to the boiling point of water. For this reason, perfluorosulphonic acid polymers, for example, are used as materials for polymer electrolyte membranes. The perfluorosulphonic acid polymer (e.g. Nafion) generally has a perfluorohydrocarbon framework, e.g. a copolymer of tetrafluoroethylene and trifluorovinyl, and a side chain which is bound thereto and bears a sulphonic acid group, e.g. a side chain having a sulphonic acid group bound to a perfluoroalkylene group. Moistening of the fuels is an important industrial requirement for the use of polymer electrolyte membrane fuel cells (PEMFCS) in which conventional, sulphonated membranes such as Nafion are used.

A second category which has been developed comprises polymer electrolyte membranes composed of complexes of basic polymers and strong acids. Thus, WO 96/13872 and the corresponding U.S. Pat. No. 5,525,436 describe a process for preparing a proton-conductive polymer electrolyte membrane, in which a basic polymer such as polybenzimidazole is treated with a strong acid such as phosphoric acid, sulphuric acid, etc.

A fuel cell in which such a polymer electrolyte membrane is used has the advantage that it can be operated without moistening and at temperatures of 100° C. or above.

In *J. Electrochem. Soc.*, volume 142, No. 7, 1995, pp. L121-L123, doping of a polybenzimidazole in phosphoric acid is described.

In the case of the basic polymer membranes known from the prior art, the mineral acid used for achieving the required proton conductivity (usually concentrated phosphoric acid) is either used after shaping or, as an alternative, the basic polymer membrane is produced directly from polyphosphoric acid as in the German patent applications Nos. 10117686.4, 10144815.5 and 10117687.2. Here, the polymer serves as support for the electrolyte consisting of the highly concentrated phosphoric acid or polyphosphoric acid. The polymer membrane here fulfils further essential functions, in particular it has to have a high mechanical stability and serve as separator for the two fuels mentioned at the outset.

An important advantage of such a membrane doped with phosphoric acid is the fact that this system can be operated at temperatures above 100° C. without moistening of the fuels which would otherwise be necessary. This is due to the ability of phosphoric acid to be able to transport protons without additional water by means of the Grotthus mechanism (K.-D. Kreuer, Chem. Mater. 1996, 8, 610-641). The ability to operate the fuel cell system at temperatures above 100° C. results in further advantages for the system. Firstly, the sensitivity of the Pt catalyst to gas impurities, in particular CO, is greatly reduced. CO is formed as by-product in the reforming of the hydrogen-rich gas from carbon-containing compounds, e.g. natural gas, methanol or petroleum spirit, or as intermediate in the direct oxidation of methanol. The CO content of the fuel typically has to be less than 100 ppm at temperatures of <100C. However, at temperatures in the range 150-200° C., 10,000 ppm or more of CO can also be tolerated (N. J. Bjerrum et. al. Journal of Applied Electrochemistry, 2001, 31, 773-779). This leads to substantial simplification of the upstream reforming process and thus to cost reductions for the overall fuel cell system.

A great advantage of fuel cells is the fact that in the electrochemical reaction the energy of the fuel is converted directly into electric energy and heat. Water is formed as reaction product at the cathode. Heat is thus produced as by-product of the electrochemical reaction. In the case of applications in which only the electric power is utilized for driving electric motors, e.g. for automobile applications, the heat has to be removed to avoid overheating of the system. Additional, energy-consuming equipment is therefore necessary for cooling, and this further reduces the overall electrical efficiency of the fuel cell. In the case of stationary applications such as for central or decentralized generation of electric power and heat, the heat can be utilized efficiently by means of existing technologies, e.g. heat exchangers. To increase the efficiency, high temperatures are desirable. If the operating temperature is above 100° C. and the temperature difference between ambient temperature and the operating temperature is large, it becomes possible to cool the fuel cell system more efficiently or to use small cooling areas and dispense with additional equipment compared to fuel cells which, owing to moistening of the membrane, have to be operated at below 100° C.

Besides these advantages, such a system has two critical disadvantages. Thus, phosphoric acid is present as an electrolyte which is not bound permanently by ionic interactions to the basic polymer and can be washed out by water. Water is, as described above, formed at the cathode in the electrochemical reaction. If the operating temperature is above 100° C., the water is mostly removed as vapour through the gas diffusion electrode and the acid loss is very small. However, if the operating temperature drops below 100° C., e.g. on starting up and shutting down the cell or in part-load operation when a high current yield is sought, the water formed condenses and can lead to increased leaching of the electrolyte, viz. highly concentrated phosphoric acid.

In the above-described mode of operation of the fuel cell, this can lead to a continual decrease in the conductivity and cell power, which can reduce the life of the fuel cell.

A further disadvantage of fuel cells in which phosphoric acid functions as electrolyte is inhibition of the reduction reaction at the cathode, resulting in a high overvoltage. This leads to a low equilibrium rest potential and a relatively low power.

Furthermore, the known membranes doped with phosphoric acid cannot be used in the direct methanol fuel cell (DMFC). However, such cells are of particular interest since a methanol/water mixture is used as fuel. If a known membrane based on phosphoric acid is used, the fuel cell fails after quite a short time.

It is therefore an object of the present invention to provide a polymer electrolyte membrane in which the leaching of the mineral acid is reduced or prevented and which additionally has a reduced overvoltage, in particular at the cathode. In particular, the operating temperature should be able to be in the extended range from <0° C. to 200° C.

A further object of the present invention was to provide a membrane which even in operation has a low permeability to a wide variety of fuels, for example hydrogen or methanol, and also displays a low oxygen permeability.

DETAILED DESCRIPTION

Figure 1:
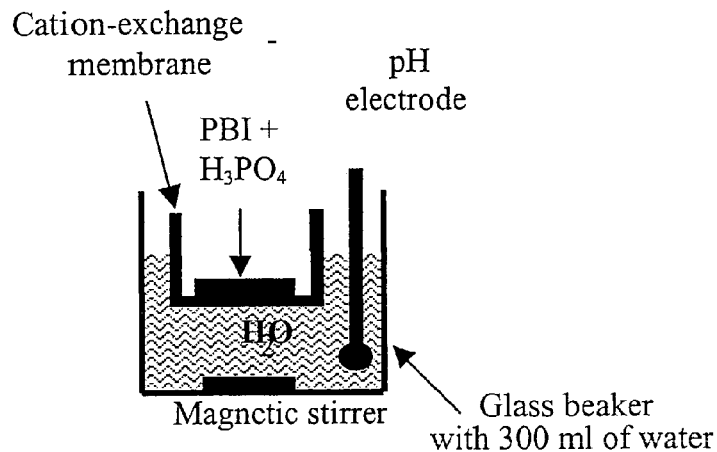
FIG. 1 is a schematic structure of the measurement apparatus employed to measure the barrier action of the cation-exchange membranes doped with phosphoric acid.

The object of the invention is achieved by a multilayer membrane system comprising a polymer electrolyte membrane which is doped with mineral acid and is coated on at least one side with a barrier layer for the mineral acid. In this configuration, the membrane doped with mineral acid performs the essential functions as separator for the fuels and the provision of mechanical stability. The barrier layer is intended to prevent the loss of mineral acid and to reduce the overvoltage at the cathode.

A polymer electrolyte membrane according to the invention has a very low methanol permeability and is particularly suitable for use in a DMFC. Long-term operation of a fuel cell using many fuels such as hydrogen, natural gas, petroleum spirit, methanol or biomass is thus possible. Here, the membranes allow a particularly high activity of these fuels. As a result of the high temperatures, the methanol oxidation can occur with high activity.

The present invention accordingly provides a multilayer electrolyte membrane comprising A. a sheet-like material doped with one or more mineral acids, and
B. at least one barrier layer which covers at least one of the two surfaces of the material specified under A.

In the case of the sheet-like materials A, use is made of basic polymers, mixtures of basic polymers with other polymers or chemically inert supports, preferably ceramic materials, in particular silicon carbides (SiC) as are described in U.S. Pat. Nos. 4,017,664 and 4,695,518. These materials are capable of transporting protons by the Grotthus mechanism.

A thermally stable and chemically inert support which is filled with phosphoric acid to achieve proton conductivity can be used as sheet-like material. Possible support materials are, for example, ceramic materials such as silicon carbide SiC (U.S. Pat. Nos. 4,017,664 and 4,695,518) or inorganic glasses. This support can, for example, be in the form of a woven fabric or a nonwoven. Furthermore, the support can also be made up of porous materials.

As chemically inert support, it is also possible to use porous organic polymers having an open pore structure. The open pore volume is in this case more than 30%, preferably more than 50% and very particularly preferably more than 70%. The glass transition temperature of the organic base polymer of such a membrane is higher than the operating temperature of the fuel cell and is preferably at least 150° C., more preferably at least 160° C. and very particularly preferably at least 180° C. Such membranes are used as separation membranes for ultrafiltration, gas separation, pervaporation, nanofiltration, microfiltration or haemodialysis.

Methods of producing such membranes are described in H. P. Hentze, M. Antonietti "Porous polymers and resins" in F. Schüth "Handbook of Porous Solids" pp. 1964-2013.

It is also possible to produce organic foams as chemically inert supports. These foams can be produced by gases such as $CO_2$ being liberated in the synthesis of the organic polymer or volatile liquids being used. Methods of producing organic foams are described in D. Klempner, K. C. Frisch "Handbook of Polymeric Foams and Foam Technology" and F. A. Shutov Advances in Polymer Science Volume 73/74, 1985, pages 63-123. Supercritical $CO_2$ can also be used as pore former.

A particularly advantageous support is a phase separation membrane composed of polybenzimidazole, which can be produced as described in U.S. Pat. Nos. 4,693,824 or 4,666, 996 or 5,091,087. The chemical stability of these membranes towards phosphoric acid or polyphosphoric acid can be further improved by crosslinking by means of the method described in U.S. Pat. No. 4,634,530.

Furthermore, it is possible to use expanded polymer films such as expanded Teflon as support materials. Methods of producing proton-conducting membranes by filling such an expanded perfluorinated membrane are described in U.S. Pat. No. 5,547,551.

Likewise, high-porosity thermosets which have been prepared by chemically induced phase separation can likewise be used as support materials. In this process, a highly volatile solvent is added to a mixture of a plurality of monomers capable of crosslinking. This solvent becomes insoluble during crosslinking and a heterogeneous polymer is formed. Evaporation of the solvent produces a chemically inert, porous thermoset which can subsequently be impregnated with phosphoric acid or polyphosphoric acid.

A particularly useful support can be produced from inorganic materials, for example glass or materials which comprise at least one compound of a metal, a semimetal or a mixed metal or phosphorus with at least one element of main groups 3 to 7. The material particularly preferably comprises at least one oxide of the elements Zr, Ti, Al or Si. The support can consist of an electrically insulating material, e.g. minerals, glasses, plastics, ceramics or natural materials. The support preferably comprises specific woven fabrics, nonwovens or porous materials composed of high-temperature-resistant and highly acid-resistant fused silica or glass. The glass preferably comprises at least one compound from the group consisting of $SiO_2$, $Al_2O_3$ or MgO. In a further variant, the support comprises Woven fabrics, nonwovens or porous materials composed of $Al_2O_3$, $ZrO_2$, $TiO_2$, $Si_3N_4$ or SiC ceramic. To keep the total resistance of the electrolyte membrane low, this support preferably has a very high porosity but also a low thickness of less than 1000 μm, preferably less than 500 μm and very particularly preferably less than 200 μm. Preference is given to using supports which comprise woven fibres of glass or fused silica, with the woven fabrics preferably being composed of 11-tex yarns with 5-50 warp threads or weft threads and preferably 20-28 warp threads and 28-36 weft threads. Particular preference is given to 5.5-tex yarns with 10-50 warp threads or weft threads and preferably 20-28 warp threads and 28-36 weft threads.

As indicated above, supports comprising woven fabrics, nonwovens or porous materials can be used. Porous materials based on, in particular, organic or inorganic foams are known.

Preferred supports are permeable to mineral acids without a barrier layer. This property can be confirmed by the experiment on barrier action presented in the examples. According to a particular aspect of the present invention, at least 5% of a mineral acid present in the sheet-like structure is liberated within 1 hour if the sheet-like material is exposed to a large excess of water (an at least 100-fold amount, based on the weight of the sheet) having a temperature of 180° C.

Depending on the field of application, the sheet-like structure A) can be stable to high temperatures. Stable to high temperatures means that the support is stable at a temperature of at least 150° C., preferably at least 200° C. and particularly preferably at least 250° C. Stable means that the significant properties of the support are retained. Thus, no change in the mechanical properties or in the chemical composition occurs on exposure of the sheet-like material for at least 1 hour.

In general, the support is chemically inert. Chemically inert means that a sheet-like material doped with a mineral acid is chemically stable. Chemically stable means that the material is not decomposed by the acid. Thus, the material after 100 hours displays at least 95% of the mechanical properties displayed by the material at the beginning of the measurement. This applies, for example, to the modulus of elasticity and the microhardness.

As basic polymer membrane doped with mineral acid, it is possible to use virtually all known polymer membranes in which the protons are transported without additional water, e.g. by means of the Grotthus mechanism.

A basic polymer for the purposes of the present invention is a basic polymer having at least one nitrogen atom in a repeating unit.

The repeating unit in the basic polymer preferably contains an aromatic ring having at least one nitrogen atom. The aromatic ring is preferably a five- or six-membered ring which has from one to three nitrogen atoms and can be fused with another ring, in particular another aromatic ring.

Polymers based on polyazole generally comprise recurring azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVI) and/or (XVII) and/or (XVIII) and/or (XIX) and/or (XX) and/or (XXI) and/or (XXII)

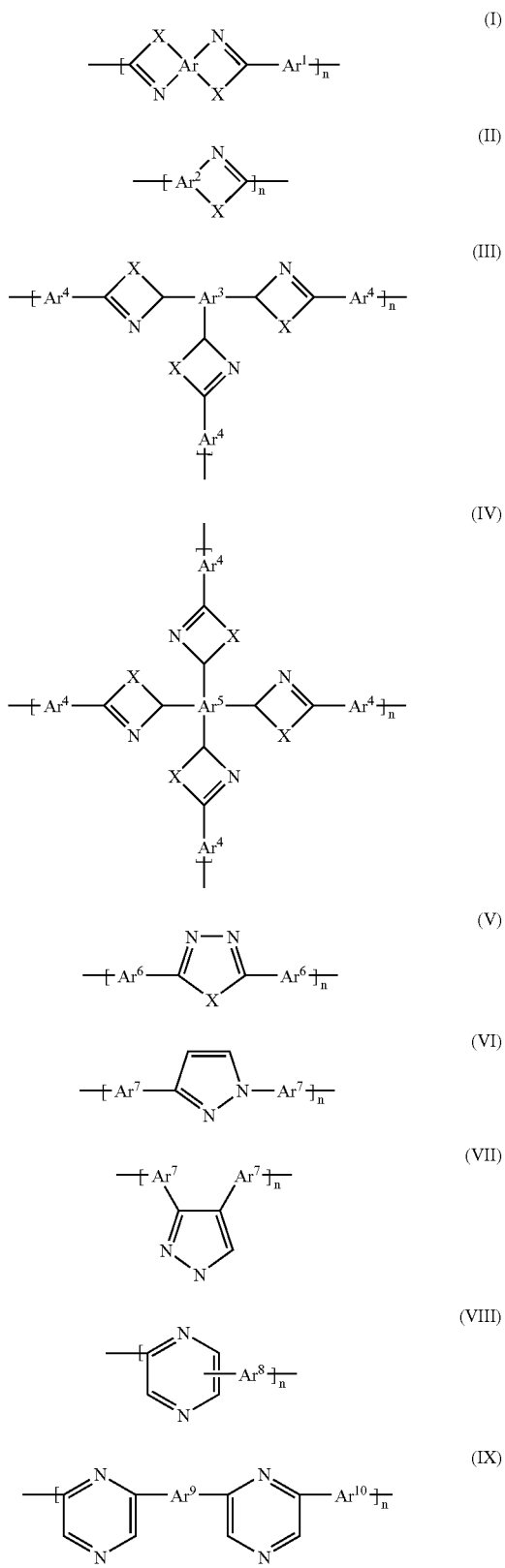

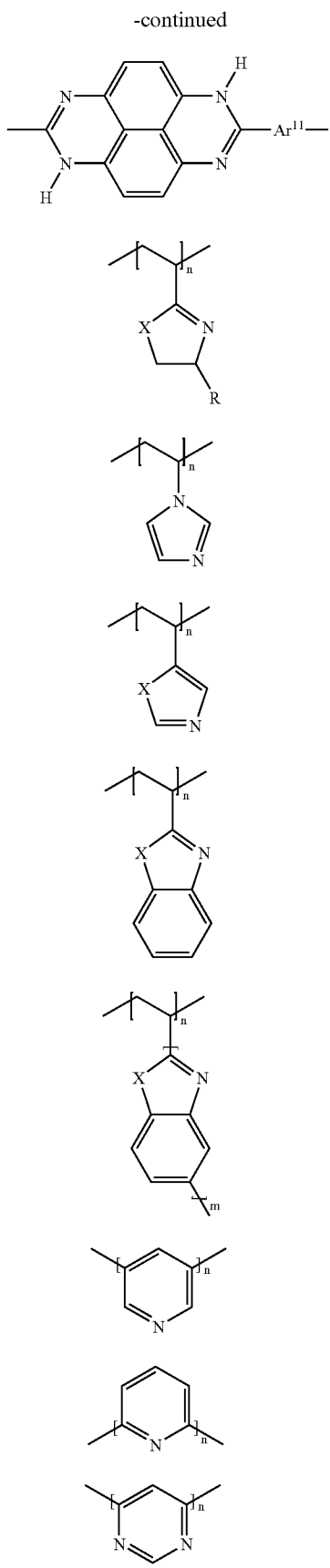

where
the radicals Ar are identical or different and are each a tetravalent aromatic or heteroaromatic group which may be monocyclic or polycyclic,
the radicals $Ar^1$ are identical or different and are each a divalent aromatic or heteroaromatic group which may be monocyclic or polycyclic,
the radicals $Ar^2$ are identical or different and are each a divalent or trivalent aromatic or heteroaromatic group which may be monocyclic or polycyclic,
the radicals $Ar^3$ are identical or different and are each a trivalent aromatic or heteroaromatic group which may be monocyclic or polycyclic,
the radicals $Ar^4$ are identical or different and are each a trivalent aromatic or heteroaromatic group which may be monocyclic or polycyclic,
the radicals $Ar^5$ are identical or different and are each a tetravalent aromatic or heteroaromatic group which may be monocyclic or polycyclic,
the radicals $Ar^6$ are identical or different and are each a divalent aromatic or heteroaromatic group which may be monocyclic or polycyclic,
the radicals $Ar^7$ are identical or different and are each a divalent aromatic or heteroaromatic group which may be monocyclic or polycyclic,
the radicals $Ar^8$ are identical or different and are each a trivalent aromatic or heteroaromatic group which may be monocyclic or polycyclic,
the radicals $Ar^9$ are identical or different and are each a divalent or trivalent or tetravalent aromatic or heteroaromatic group which may be monocyclic or polycyclic,
the radicals $Ar^{10}$ are identical or different and are each a divalent or trivalent aromatic or heteroaromatic group which may be monocyclic or polycyclic,
the radicals $Ar^{11}$ are identical or different and are each a divalent aromatic or heteroaromatic group which may be monocyclic or polycyclic,
the radicals X are identical or different and are each oxygen, sulphur or an amino group which bears a hydrogen atom, a group containing 1-20 carbon atoms, preferably a branched or unbranched alkyl or alkoxy group, or an aryl group as further radical, the radicals R are identical or different and are each hydrogen, an alkyl group or an aromatic group and n, m are each an integer greater than or equal to 10, preferably greater than or equal to 100.

Aromatic or heteroaromatic groups which are preferred according to the invention are derived from benzene, naphthalene, biphenyl, diphenyl ether, diphenylmethane, diphenyldimethylmethane, bisphenone, diphenyl sulphone, thiophene, furan, pyrrole, thiazole, oxazole, imidazole, isothiazole, isoxazole, pyrazole, 1,3,4-oxadiazole, 2,5-diphenyl-1,3,4-oxadiazole, 1,3,4-thiadiazole, 1,3,4-triazole, 2,5-diphenyl-1,3,4-triazole, 1,2,5-triphenyl-1,3,4-triazole, 1,2,4-oxadiazole, 1,2,4-thiadiazole, 1,2,4-triazole, 1,2,3-triazole, 1,2,3,4-tetrazole, benzo[b]thiophene, benzo[b]furan, indole, benzo[c]thiophene, benzo[c]furan, isoindole, benzoxazole, benzothiazole, benzimidazole, benzisoxazole, benzisothiazole, benzopyrazole, benzothiadiazole, benzotriazole, dibenzofuran, dibenzothiophene, carbazole, pyridine, bipyridine, pyrazine, pyrazole, pyrimidine, pyridazine, 1,3,5-triazine, 1,2,4-triazine, 1,2,4,5-triazine, tetrazine, quinoline, isoquinoline, quinoxaline, quinazoline, cinnoline, 1,8-naphthyridine, 1,5-naphthyridine, 1,6-naphthyridine, 1,7-naphthyridine, phthalazine, pyridopyrimidine, purine, pteridine or quinolizine, 4H-quinolizine, diphenyl ether, anthracene, benzopyrrole, benzooxathiadiazole, benzooxadiazole, benzopyridine, benzopyrazine, benzopyrazidine, benzopyrimidine, benzotriazine, indolizine, pyridopyridine, imidazopyrimidine, pyrazinopyrimidine, carbazole, aciridine, phenazine, benzoquinoline, phenoxazine, phenothiazine, acridizine, benzopteridine, phenanthroline and phenanthrene, which may also be substituted.

Here, $Ar^1, Ar^4, Ar^6, Ar^7, Ar^8, Ar^9, Ar^{10}, Ar^{11}$ can have any substitution pattern; in the case of phenylene, for example, $Ar^1, Ar^4, Ar^6, Ar^7, Ar^8, Ar^9, Ar^{10}, Ar^{11}$ can be ortho-, meta- or para-phenylene. Particularly preferred groups are derived from benzene and biphenyls, which may also be substituted.

Preferred alkyl groups are short-chain alkyl groups having from 1 to 4 carbon atoms, e.g. methyl, ethyl, n- or i-propyl and t-butyl groups.

Preferred aromatic groups are phenyl or naphthyl groups. The alkyl groups and the aromatic groups may be substituted.

Preferred substituents are halogen atoms such as fluorine, amino groups, hydroxy groups or short-chain alkyl groups such as methyl or ethyl groups.

Preference is given to polyazoles which comprise recurring units of the formula (I) and in which the radicals X are identical within a recurring unit.

The polyazoles can in principle also be made up of different recurring units which differ, for example, in their radical X. However, the polyazole preferably has only identical radicals X in a recurring unit.

Further preferred polyazole polymers are polyimidazoles, polybenzothiazoles, polybenzoxazoles, polyoxadiazoles, polyquinoxalines, polythiadiazoles, poly(pyridines), poly(pyrimidines) and poly(tetrazapyrenes).

In a further embodiment of the present invention, the polymer comprising recurring azole units is a copolymer or a blend comprising at least two units of the formulae (I) to (XXII) which differ from one another. The polymers can be in the form of block copolymers (diblock, triblock), random copolymers, periodic copolymers and/or alternating polymers.

In a particularly preferred embodiment of the present invention, the polymer comprising recurring azole units is a polyazole made up only of units of the formula (I) and/or (II).

The number of recurring azole units in the polymer is preferably greater than or equal to 10. Particularly preferred polymers contain at least 100 recurring azole units.

For the purposes of the present invention, polymers comprising recurring benzimidazole units are preferred. Some examples of extremely advantageous polymers comprising recurring benzimidazole units have the following formulae:

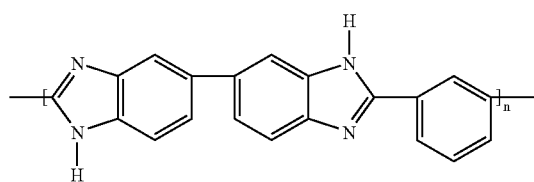
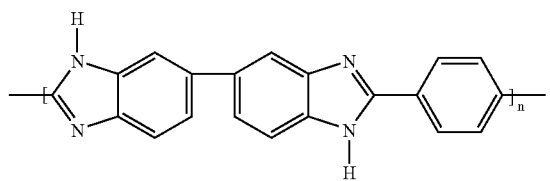
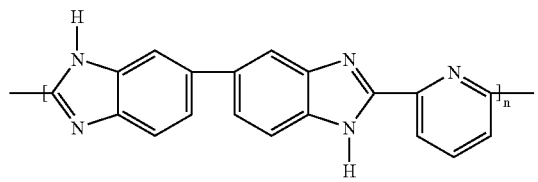
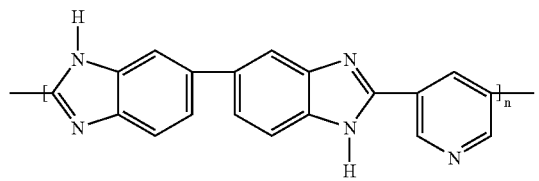
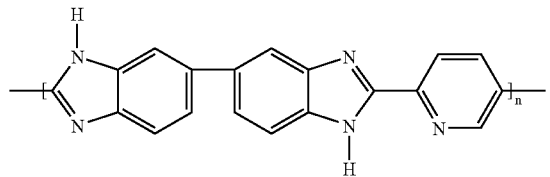
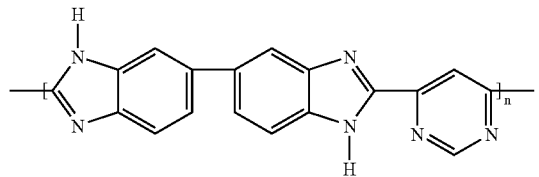

-continued
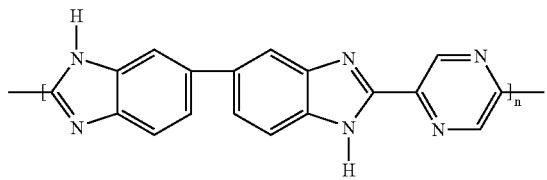
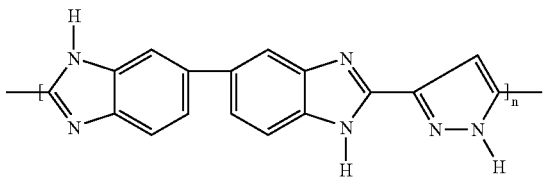
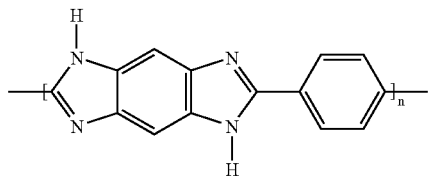
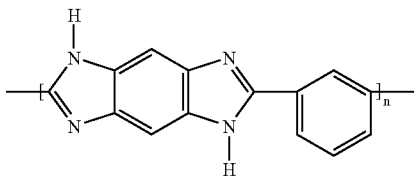
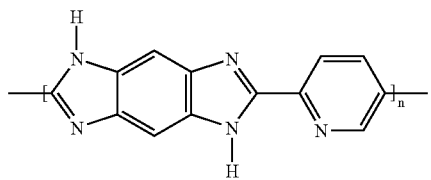
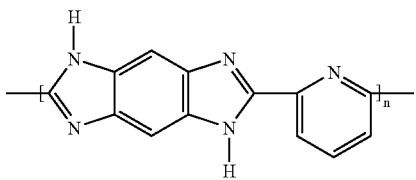
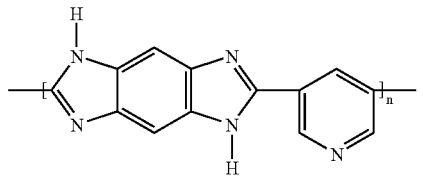
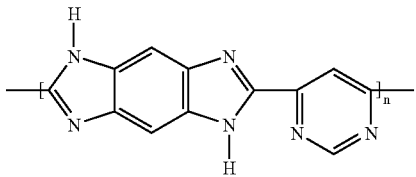
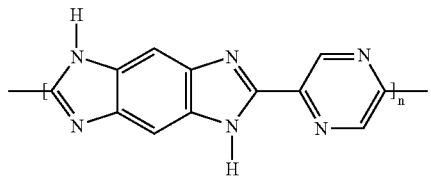
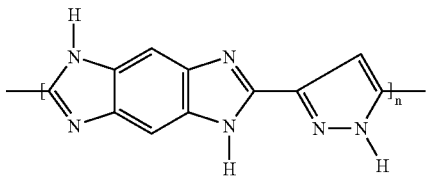
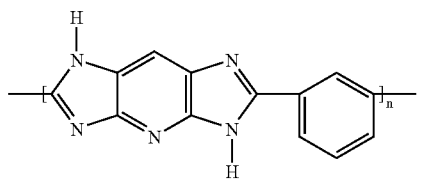
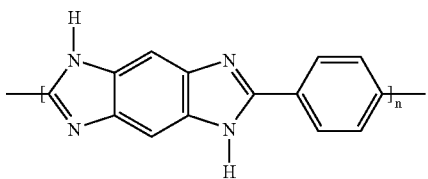
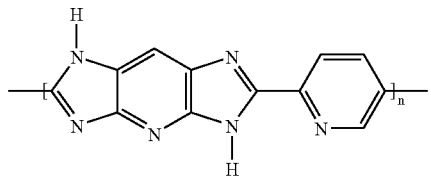
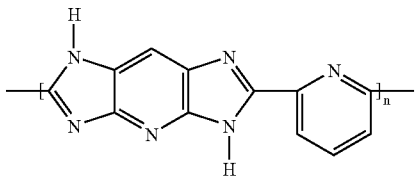
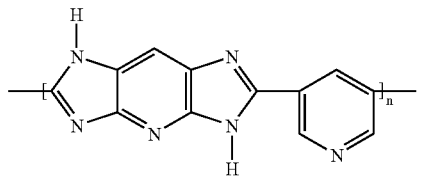
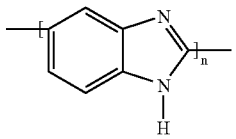
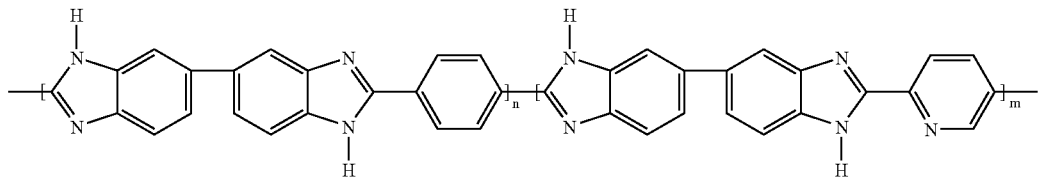

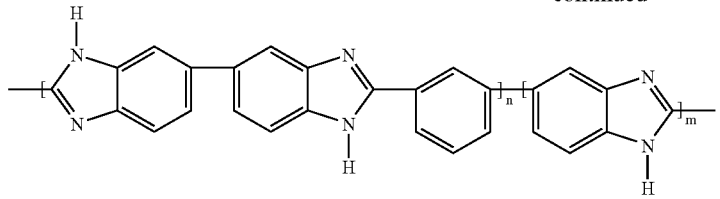

where n and m are each an integer greater than or equal to 10, preferably greater than or equal to 100.

Further preferred polyazole polymers are polyimidazoles, polybenzimidazole ether ketone, polybenzothiazoles, polybenzoxazoles, polytriazoles, polyoxadiazoles, polythiadiazoles, polypyrazoles, polyquinoxalines, poly(pyridines), poly(pyrimidines) and poly(tetrazapyrenes).

Preferred polyazoles have a high molecular weight. This applies in particular to the polybenzimidazoles. Measured as intrinsic viscosity, it is in the range from 0.3 to 10 dl/g, preferably from 1 to 5 dl/g.

Particular preference is given to Celazole from Celanese. The properties of the polymer film and polymer membrane can be improved by sieving the starting polymer, as described in the German patent application No. 10129458.1.

The polymer film based on basic polymers which is used for doping can contain further additions of fillers and/or auxiliaries. In addition, the polymer film can be modified in further ways, for example by crosslinking as in the German patent application No. 10110752.8 or in WO 00/44816. In a preferred embodiment, the polymer film comprising a basic polymer and at least one blend component which is used for doping additionally contains a crosslinker as described in the German patent application No. 10140147.7. An important advantage of such a system is the fact that higher degrees of doping and thus higher conductivities combined with satisfactory mechanical stability of the membrane can be achieved.

Apart from the abovementioned basic polymers, it is also possible to use a blend of one or more basic polymers with a further polymer. The blend component essentially has the task of improving the mechanical properties and reducing the material costs. A preferred blend component is polyether sulphone as described in the German patent application No. 10052242.4.

Preferred polymers which can be used as blend component include, inter alia, polyolefins such as poly(chloroprene), polyacetylene, polyphenylene, poly(p-xylylene), polyarylmethylene, polyarmethylene, polystyrene, polymethylstyrene, polyvinyl alcohol, polyvinyl acetate, polyvinyl ether, polyvinylamine, poly(N-vinylacetamide), polyvinylimidazole, polyvinylcarbazole, polyvinylpyrrolidone, polyvinylpyridine, polyvinyl chloride, polyvinylidene chloride, polytetrafluoroethylene, polyhexafluoropropylene, copolymers of PTFE with hexafluoropropylene, with perfluoropropyl vinyl ether, with trifluoronitrosomethane, with sulphonyl fluoride vinyl ether, with carbalkoxyperfluoroalkoxy vinyl ether, polychlorotrifluoroethylene, polyvinyl fluoride, polyvinylidene fluoride, polyacrolein, polyacrylamide, polyacrylonitrile, polycyanoacrylates, polymethacrylimide, cycloolefinic copolymers, in particular those of norbornene;

polymers having C—O bonds in the main chain, for example polyacetal, polyoxymethylene, polyether, polypropylene oxide, polyepichlorohydrin, polytetrahydrofuran, polyphenylene oxide, polyether ketone, polyesters, in particular polyhydroxyacetic acid, polyethylene terephthalate, polybutylene terephthalate, polyhydroxybenzoate, polyhydroxypropionic acid, polypivalolactone, polycaprolactone, polymalonic acid, polycarbonate;

polymers having C—S bonds in the main chain, for example polysulphide ethers, polyphenylene sulphide, polyether sulphone; polymers having C—N bonds in the main chain, for example polyimines, polyisocyanides, polyetherimine, polyaniline, polyamides, polyhydrazides, polyurethanes, polyimides, polyazoles, polyazines;

liquid-crystalline polymers, in particular Vectra and also inorganic polymers, for example polysilanes, polycarbosilanes, polysiloxanes, polysilicic acid, polysilicates, silicones, polyphosphazenes and polythiazyl.

For use in fuel cells having a long-term use temperature above 100° C., preference is given to blend polymers which have a glass transition temperature or Vicat softening temperature VST/A/50 of at least 100° C., preferably at least 150° C. and very particularly preferably at least 180° C.

Preference is here given to polysulphones having a Vicat softening temperature VST/A/50 of from 180° C. to 230° C.

Preferred polymers include polysulphones, in particular polysulphone having an aromatic in the main chain. According to a particular aspect of the present invention, preferred polysulphones and polyether sulphones have a melt volume rate MVR 300/21.6 of less than or equal to 40 cm$^3$/10 min, in particular less than or equal to 30 cm$^3$/10 min and particularly preferably less than or equal to 20 cm$^3$/10 min, measured in accordance with ISO 1133.

To improve the use properties further, the sheet-like material can contain fillers, in particular proton-conducting fillers.

Nonlimiting examples of proton-conducting fillers are sulphates such as: $CsHSO_4$, $Fe(SO_4)_2$, $(NH_4)_3H(SO_4)_2$, $LiHSO_4$, $NaHSO_4$, $KHSO_4$, $RbSO_4$, $LiN_2H_5SO_4$, $NH_4HSO_4$, phosphates such as $Zr_3(PO_4)_4$, $Zr(HPO_4)_2$, $HZr_2(PO_4)_3$, $UO_2PO_4.3H_2O$, $H_8UO_2PO_4$, $Ce(HPO_4)_2$, $Ti(HPO_4)_2$, $KH_2PO_4$, $NaH_2PO_4$, $LiH_2PO_4$, $NH_4H_2PO_4$, $CsH_2PO_4$, $CaHPO_4$, $MgHPO_4$, $HSbP_2O_8$, $HSb_3P_2O_{14}$, $H_5Sb_5P_2O_{20}$, polyacids such as $H_3PW_{12}O_{40}.nH_2O$ (n=21-29), $H_3SiW_{12}O_{40}.nH_2O$ (n=21-29), $H_xWO_3$, $HSbWO_6$, $H_3PMo_{12}O_{40}$, $H_2Sb_4O_{11}$, $HTaWO_6$, $HNbO_3$, $HTiNbO_5$, $HTiTaO_5$, $HSbTeO_6$, $H_5Ti_4O_9$, $HSbO_3$, $H_2MoO_4$ selenites and arsenides such as $(NH_4)_3H(SeO_4)_2$, $UO_2AsO_4$, $(NH_4)_3H(SeO_4)_2$, $KH_2AsO_4$, $Cs_3H(SeO_4)_2$, $Rb_3H(SeO_4)_2$, oxides such as $Al_2O_3$, $Sb_2O_5$, $ThO_2$, $SnO_2$, $ZrO_2$, $MoO_3$ silicates such as zeolites, zeolites($NH_4^+$), sheet silicates, framework silicates, H-natrolites, H-mordenites, $NH_4$-analcines, $NH_4$-sodalites, $NH_4$-gallates, H-montmorillonites acids such as $HClO_4$, $SbF_5$ fillers such as carbides, in particular SiC, $Si_3N_4$, fibres, in particular glass fibres, glass powders and/or polymer fibres, preferably ones based on polyazoles.

These additives can be present in customary amounts in the proton-conducting polymer membrane, but the positive properties such as high conductivity, long life and high mechanical stability of the membrane should not be impaired too much by addition of excessively large amounts of additives. In general, the membrane comprises not more than 80% by weight, preferably not more than 50% by weight and particularly preferably not more than 20% by weight, of additives.

To produce the polymer film, the polymer constituents are firstly dissolved or suspended as described in the above-cited patent applications, for example DE No. 10110752.8 or WO 00/44816, and subsequently used for producing the polymer films. Furthermore, the polymer films as described in DE No. 10052237.8 can be produced continuously.

As an alternative, film formation can be carried out by the process described in the Japanese patent application No. Hei 10-125560.

Here, the solution is poured into a cylinder having a cylindrical interior surface and the cylinder is subsequently set into rotation. At the same time, the solvent is allowed to evaporate by means of the centrifugal force caused by the rotation, so that a cylindrical polymer film of largely uniform thickness is formed on the interior surface of the cylinder.

The basic polymer having a uniform matrix can be formed by this process.

This process described in the Japanese patent application Hei 10-125560 is likewise incorporated by reference into the present description.

The solvent is subsequently removed. This can be achieved by methods known to those skilled in the art, for example by drying.

The film of basic polymer or polymer blend is subsequently impregnated or doped with a strong acid, preferably a mineral acid, with the film as described in the German patent application No. 10109829.4 being able to be treated beforehand. This variant is advantageous in order to rule out interactions of the residual solvent with the barrier layer.

For this purpose, the film of basic polymer or polymer blend is dipped into a strong acid so that the film is impregnated with the strong acid and becomes a proton-conducting membrane. For this purpose, the basic polymer is usually dipped into a highly concentrated strong acid having a temperature of at least 35° C. for a period of from a number of minutes to a number of hours.

As strong acid, use is made of mineral acid, in particular phosphoric acid and/or sulphuric acid.

For the purposes of the present description, the term "phosphoric acid" refers to polyphosphoric acid ($H_{n+2}P_nO_{3n+1}$) (n>1) usually has an assay calculated as $P_2O_5$ (acidimetric) of at least 83%, phosphonic acid ($H_3PO_3$), orthophosphoric acid ($H_3PO_4$), pyrophosphoric acid ($H_4P_2O_7$), triphosphoric acid ($H_5P_3O_{10}$) and metaphosphoric acid. The phosphoric acid, in particular orthophosphoric acid, preferably has a concentration of at least 80 percent by weight, particularly preferably a concentration of at least 85 percent by weight, more preferably a concentration of at least 87 percent by weight and very particularly preferably a concentration of at least 89 percent by weight. The reason for this is that as the concentration of the strong acid increases, the basic polymer can be impregnated with a greater number of molecules of strong acid.

The polymer electrolyte membrane obtained, namely the complex of the basic polymer and the strong acid, is proton-conducting. After doping, the degree of doping expressed as mole of acid per repeating unit should be greater than 6, preferably greater than 8 and very particularly preferably greater than 9.

In place of polymer membranes based on basic polymers which have been produced by means of classical methods, it is also possible to use polyazole-containing polymer membranes as described in the German patent applications Nos. 10117686.4, 10144815.5, 10117687.2. Such polymer electrolyte membranes provided with at least one barrier layer are likewise subject-matter of the present invention.

Accordingly, sheet-like materials according to the invention can be obtained by a process comprising the steps i) preparation of a mixture comprising
   polyphosphoric acid,
   at least one polyazole and/or at least one compound which are/is suitable for forming polyazoles under the action of heat as described in step ii), ii) heating of the mixture obtainable as described in step i) under inert gas to temperatures of up to 400° C., iii) application of a layer to a support using the mixture as described in step i) and/or ii), iv) treatment of the membrane formed in step iii).

For this purpose, one or more compounds which are suitable for forming polyazoles under the action of heat as described in step ii) can be added to the mixture from step i).

Mixtures comprising one or more aromatic and/or heteroaromatic tetraamino compounds and one or more aromatic and/or heteroaromatic carboxylic acids or derivatives thereof which have at least two acid groups per carboxylic acid monomer are suitable for this purpose. Furthermore, it is possible to use one or more aromatic and/or heteroaromatic diaminocarboxylic acids for preparing polyazoles.

Suitable aromatic and heteroaromatic tetraamino compounds include, inter alia, 3,3',4,4'-tetraminobiphenyl, 2,3,5,6-tetraminopyridine, 1,2,4,5-tetraminobenzole, bis(3,4,diaminodiphenyl) sulphone, bis(3,4,-diaminodiphenyl ether, 3,3',4,4'-tetraminobenzophenone, 3,3',4,4'-tetraminodiphenylmethane and 3,3',4,4'-tetraminodiphenyldimethylmethane and also salts thereof, in particular monohydrochloride, dihydrochloride, trihydrochloride and tetrahydrochloride derivatives thereof. Among these, particular preference is given to 3,3',4,4'-tetraminobiphenyl, 2,3,5,6-tetraminopyridine and 1,2,4,5-tetraminobenzole.

Furthermore, the mixture A) can comprise aromatic and/or heteroaromatic carboxylic acids. These are dicarboxylic acids and tricarboxylic acids and tetracarboxylic acids or their esters or their anhydrides or their acid halides, in particular their acid halides and/or acid bromides. The aromatic dicarboxylic acids are preferably isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, (diphenyl ether)-4,4'-dicarboxylic acid, benzophenone-4,4'-dicarboxylic acid, (diphenyl sulphone)-4,4'-dicarboxylic acid, biphenyl-4,4'-dicarboxylic acid, 4-trifluoromethylphthalic acid, 2,2-bis(4-carboxyphenyl)hexafluoropropane, 4,4'-stilbenedicarboxylic acid, 4-carboxycinnamic acid, or their C1-C20-alkyl esters or C5-C1-2-aryl esters or their acid anhydrides or their acid chlorides.

The heteroaromatic carboxylic acids are heteroaromatic dicarboxylic acids and tricarboxylic acids and tetracarboxylic acids or their esters or their anhydrides. For the purposes of the present invention, heteroaromatic carboxylic acids are aromatic systems which contain at least one nitrogen, oxygen, sulphur or phosphorus atom in the aromatic. Preference is given to pyridine-2,5-dicarboxylic acid, pyridine-3,5-dicarboxylic acid, pyridine-2,6-dicarboxylic acid, pyridin-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazined icarboxylic acid, 2,4,6-pyridinetricarboxylic acid, benzimidazole-5,6-dicarboxylic acid, and also their C1-C20-alkyl esters or C5-C12-aryl esters, or their acid anhydrides or their acid chlorides.

Furthermore, the mixture i) can also contain aromatic and heteroaromatic diaminocarboxylic acids. These include, inter alia, diaminobenzoic acid, 4-phenoxycarbonylphenyl 3,'4'-diaminophenyl ether and their monohydrochloride and dihydrochloride derivatives.

The mixture prepared in step i) preferably comprises at least 0.5% by weight, in particular from 1 to 30% by weight and particularly preferably from 2 to 15% by weight, of monomers for preparing polyazoles.

According to a further aspect of the present invention, the mixture prepared in step A) comprises compounds which are suitable for forming polyazoles under the action of heat as described in step B), with these compounds being obtainable by reacting one or more aromatic and/or heteroaromatic tetraamino compounds with one or more aromatic and/or heteroaromatic carboxylic acids or derivatives thereof which contain at least two acid groups per carboxylic acid monomer, or by reaction of one or more aromatic and/or heteroaromatic diaminocarboxylic acids in the melt at temperatures of up to 400° C., in particular up to 350° C., preferably up to 280° C. The compounds used for preparing these prepolymers have been described above.

Furthermore, polyazoles can be prepared using monomers which contain covalently bound acid groups. These include, inter alia, aromatic and heteroaromatic dicarboxylic acids or derivatives thereof which have at least one phosphonic acid group, for example 2,5-dicarboxyphenylphosphonic acid, 2,3-dicarboxyphenylphosphonic acid, 3,4-dicarboxyphenylphosphonic acid and 3,5-dicarboxyphenylphosphonic acid; aromatic and heteroaromatic dicarboxylic acids and derivatives thereof which contain at least one sulphonic acid group, in particular 2,5-dicarboxyphenylsulphonic acid, 2,3-dicarboxyphenylsulphonic acid, 3,4-dicarboxyphenylsulphonic acid and 3,5-dicarboxyphenylsulphonic acid; aromatic and heteroaromatic diaminocarboxylic acids containing at least one phosphonic acid group, for example 2,3-diamino-5-carboxyphenylphosphonic acid, 2,3-diamino-6-carboxyphenylphosphonic acid and 3,4-diamino-6-carboxyphenylphosphonic acid; aromatic and heteroaromatic diaminocarboxylic acids containing at least one sulphonic acid group, for example 2,3-diamino-5-carboxyphenylsulphonic acid, 2,3-diamino-6-carboxyphenylsulphonic acid and 3,4-diamino-6-carboxyphenylsulphonic acid.

A polyazole membrane produced by the process described above can contain the optional components described above. These include, in particular, blend polymers and fillers. Blend polymers can, inter alia, be dissolved, dispersed or suspended in the mixture obtained as described in step i) and/or step ii). Here, the weight ratio of polyazole to polymer (B) is preferably in the range from 0.1 to 50, more preferably from 0.2 to 20, particularly preferably from 1 to 10, without this implying a restriction. If the polyazole is formed only in step ii), the weight ratio can be calculated from the weight of monomers for forming the polyazole, with the compounds liberated in the condensation, for example water, being taken into account.

To improve the use properties further, fillers, in particular proton-conducting fillers, and additional acids can additionally be added to the membrane. The addition can, for example, be effected in step i), step ii) and/or step iii). Furthermore, these additives can, if they are in liquid form, also be added after the polymerization according to step iv). These additives have been described above.

The polyphosphoric acid used in step i) is a commercial polyphosphoric acid as is obtainable, for example, from Riedel-de Haen. Polyphosphoric acids $H_{n+2}P_nO_{3n+1}$ (n>1) usually have an assay calculated as $P_2O_5$ (acidimetric) of at least 83%. Instead of a solution of the monomers, a dispersion/suspension can also be produced.

In step ii) the mixture obtained in step i) is heated to a temperature of up to 400° C., in particular 350° C., preferably up to 280° C., in particular from 100° C. to 250° C. and particularly preferably in the range from 200° C. to 250° C. This is carried out using an inert gas, for example nitrogen or a noble gas such as neon, argon.

The mixture prepared in step i) and/or step ii) can additionally contain organic solvents. These can have a positive influence on the processability. Thus, for example, the rheology of the solution can be improved so that it can be extruded or applied by doctor blade coating more easily.

The formation of the sheet-like structure in step iii) is carried out by means of measures known per se (casting, spraying, doctor blade coating, extrusion) which are known from the prior art relating to polymer film production. Suitable supports are all supports which may be regarded as inert under the conditions. These supports include, in particular, films composed of polyethylene terephthalate (PET), polytetrafluoroethylene (PTFE), polyhexafluoropropylene, copolymers of PTFE with hexafluoropropylene, polyimides, polyphenylene sulphides (PPS) and polypropylene (PP). Furthermore, the membrane can also be formed directly on the electrode provided with a barrier layer.

The thickness of the sheet-like structure produced in step iii) is preferably from 10 to 4000 μm, more preferably from 15 to 3500 μm, in particular from 20 to 3000 μm, particularly preferably from 30 to 1500 μm and very particularly preferably from 50 to 1200 μm.

The treatment of the membrane in step iv) is carried out, in particular, at temperatures in the range from 0° C. to 150° C., preferably at temperatures of from 10° C. to 120° C., in particular from room temperature (20° C.) to 90° C., in the presence of moisture or water and/or water vapour. The treatment is preferably carried out under atmospheric pressure, but can also be carried out at superatmospheric pressure. It is important that the treatment occurs in the presence of sufficient moisture, with the polyphosphoric acid present contributing to strengthening of the membrane by partial hydrolysis to form low molecular weight polyphosphoric acid and/or phosphoric acid.

The partial hydrolysis of polyphosphoric acid in step iv) leads to strengthening of the membrane and to a decrease in the layer thickness and formation of a membrane. The strengthened membrane generally has a thickness in the range from 15 to 3000 μm, preferably from 20 to 2000 μm, in particular from 20 to 1500 μm.

The upper limit to the temperature of the treatment in step iv) is generally 150° C. If moisture acts for an extremely short time, for example in the case of superheated steam, this steam can also be hotter than 150° C. The upper limit to the temperature is critically dependent on the duration of the treatment.

The partial hydrolysis (step iv) can also be carried out in temperature- and humidity-controlled chambers in which the hydrolysis can be controlled in a targeted manner under a defined action of moisture. Here, the humidity can be set in a targeted manner by means of the temperature or saturation of the gases, for example, coming into contact with the membrane, e.g. air, nitrogen, carbon dioxide or other suitable gases, or water vapour. The treatment time is dependent on the parameters selected above.

Furthermore, the treatment time is dependent on the thickness of the membrane.

In general, the treatment time is from a few seconds to minutes, for example under the action of superheated steam, or up to a number of full days, for example in air at room temperature and low relative atmospheric humidity. The treatment time is preferably in the range from 10 seconds to 300 hours, in particular from 1 minute to 200 hours.

If the partial hydrolysis is carried out at room temperature (20° C.) using ambient air having a relative atmospheric humidity of 40-80%, the treatment time is from 1 to 200 hours.

The membrane obtained in step iv) can be made self-supporting, i.e. it can be detached from the support without damage and subsequently processed further directly, if appropriate.

The treatment in step iv) leads to hardening of the coating. If the membrane is formed directly on the electrode, the treatment in step D) is continued until the coating has a hardness sufficient to be able to be pressed to form a membrane-electrode unit. A sufficient hardness is ensured when a membrane treated in this way is self-supporting. However, a lower hardness is sufficient in many cases. The hardness determined in accordance with DIN 50539 (microhardness measurement) is generally at least 1 mN/mm$^2$, preferably at least 5 mN/mm$^2$ and very particularly preferably at least 50 mN/mm$^2$, without this implying a restriction.

The concentration and amount of phosphoric acid and thus the conductivity of the polymer membrane of the invention can be adjusted via the degree of hydrolysis, i.e. the time, temperature and ambient humidity. According to the invention, the concentration of phosphoric acid is reported as mole of acid per mole of repeating unit of polymer. For the purposes of the present invention, a concentration (mole of phosphoric acid per mole of repeating units of the formula (III), i.e. polybenzimidazole) of from 10 to 80, in particular from 12 to 60, is preferred. Such high degrees of doping (concentrations) can be obtained only with great difficulty or not at all by doping of polyazoles with commercially available orthophosphoric acid.

The thickness of the barrier layer of a multilayer polymer electrolyte membrane according to the invention is generally not critical as long as this layer has a sufficient barrier action against mineral acids. The barrier action can be determined via the amount of mineral acid which can be leached out by means of water. According to a particular aspect of the present invention, not more than 10%, preferably not more than 5%, of the mineral acid goes over into the aqueous phase during a period of one hour. These values are based on the weight of mineral acid or the weight of the sheet-like material doped with the mineral acid, with the area which is in contact with water being in each case employed for calculating the value.

In a particular embodiment of the present invention, the thickness of the barrier layer is less than 10 µm, preferably from 1 to 8 µm and particularly preferably from 2 to 6 µm. Such barrier layers have the advantage of a relatively low resistance.

In a further embodiment of the present invention, the thickness of the barrier layer is at least 10 µm and is preferably in the range from 10 µm to 30 µm. Such barrier layers advantageously have a particularly high barrier action and also a high stability.

The thickness of the barrier layer can be measured by means of scanning electron microscopy (SEM). Here, the thickness of the barrier layer is the mean of the thickness obtained via the ratio of area to length of the barrier layer.

The barrier layer according to the invention is preferably a cation-exchange material. This cation-exchange material allows protons but not anions such as phosphate anions to be transported. To improve adhesion, block copolymers comprising components of the polymerelectrolyte membrane and the cation-exchange membrane can also be used at the interface between polymer electrolyte membrane and cation-exchange material.

This barrier layer can be joined (laminated) in the form of a separate film, preferably self-supporting, to the doped polymer membrane or the doped polymer blend membrane.

Furthermore, the barrier layer can be formed by applying a layer to the doped membrane and/or the electrode. For this purpose, it is possible, for example, to apply a mixture comprising cation-exchange material or a precursor material to the membrane and/or the electrode. Suitable processes include, inter alia, casting, spraying, doctor blade coating and/or extrusion.

The barrier layer can also have a gradient. Thus, for example, the concentration of acid groups can be varied. Such gradients can be measured, for example, by means of energy-dispersive X-ray scattering (EDX), location-resolved Raman spectroscopy and location-resolved infrared spectroscopy.

In a variant of the present invention, if the cation-exchange material is present in the form of a self-supporting film, this can also be incorporated as a separate film in an MEU between the doped polymer electrolyte membrane and the catalyst layer or the electrode (also on both sides).

It has been found that it is advantageous for the barrier layer to be located on the cathode side of the polymer electrolyte membrane, since the overvoltage is significantly reduced. However, apart from this embodiment, the barrier layer can also be applied on both sides.

As indicated above, the cation-exchange material is not subject to any significant restriction. Preference is given to materials whose cation-exchange capacity is less than 0.9 meq/g, in particular less than 0.8 meq/g. The cation-exchange capacity is, according to a particular aspect of the present invention, at least 0.1 meq/g, in particular 0.2 meq/g, without this implying a restriction. Preference is given to materials whose area swelling in water at 80° C. is less than 20%, in particular less than 10%. Preference is given to materials whose conductivity at 80° C. in the moistened state is less than 0.06 S/cm, in particular less than 0.05 S/cm.

To measure the IEC, the sulphonic acid groups are converted into the free acid. For this purpose, the polymer is treated in a known manner with acid, with excess acid being removed by washing. The sulphonated polymer is firstly treated for 2 hours in boiling water. Excess water is subsequently dabbed off and the sample is dried at 160° C. and p<1 mbar in a vacuum drying oven for 15 hours. The dry weight of the membrane is then determined. The polymer which has been dried in this way is then dissolved in DMSO at 80° C. for 1 hour. The solution is subsequently titrated with 0.1 M NaOH. The ion-exchange capacity (IEC) is then calculated from the consumption of acid to the equivalence point and the dry weight.

At a high current density and temperatures above 100° C., moistening of this thin layer is effected by the product water produced at the cathode. When hydrogen-rich reformer gas is used, the moisture present in the reformer gas is sufficient to moisten the barrier layer. Thus, the system requires no additional moistening at temperatures above 100° C. and high electric power. However, it may sometimes be necessary to moisten the fuels additionally on start-up or at low temperatures or at low current densities. The barrier layer applied on the cathode side is preferably thicker than the barrier layer located on the anode side.

The barrier layer preferably comprises a cation-exchange material. Here, it is in principle possible to use all cation-exchange materials which can be processed to form membranes. These are preferably organic polymers having covalently bound acid groups. Particularly suitable acid groups include, inter alia, carboxylic acid, sulphonic acid and phosphonic acid groups, with polymers containing sulphonic acid groups being particularly preferred. Methods of sulphonating polymers are described in F. Kucera et. al. Polymer Engineering and Science 1988, Vol. 38, No 5, 783-792.

The cation-exchange materials preferably used as barrier layers can generally not be used alone as cation-exchange membranes in fuel cells, since their proton conductivity and swelling is too low and mechanical stability cannot be ensured because of the low thickness. However, the cation-exchange membranes described in the prior art have been developed with high ion-exchange capacity, high swelling, high proton conductivity and sufficient thickness to achieve sole use as polymer electrolyte membranes in MEUs.

The most important types of cation-exchange membranes which have achieved commercial importance for use in fuel cells are described below.

The most important representative is the perfluorosulphonic acid polymer Nafion® (U.S. Pat. No. 3,692,569). This polymer can be brought into solution as described in U.S. Pat. No. 4,453,991 and then used as ionomer. Cation-exchange membranes are also obtained by filling a porous support material with such an ionomer. As support material, preference is given to expanded Teflon (U.S. Pat. No. 5,635,041).

A further perfluorinated cation-exchange membrane can be produced as described in U.S. Pat. No. 5,422,411 by copolymerization of trifluorostyrene and sulphonyl-modified trifluorostyrene. Composite membranes comprising a porous support material, in particular expanded Teflon, filled with ionomers consisting of such sulphonyl-modified trifluorostyrene copolymers are described in U.S. Pat. No. 5,834,523.

U.S. Pat. No. 6,110,616 describes copolymers of butadiene and styrene and their subsequent sulphonation to produce cation-exchange membranes for fuel cells.

A further class of partially fluorinated cation-exchange membranes can be produced by radiation grafting and subsequent sulphonation. Here, a grafting reaction, preferably using styrene, is carried out on a previously irradiated polymer film, as described in EP-A-667983 or DE-A-19844645. In a subsequent sulphonation reaction, the side chains are then sulphonated. Crosslinking can also be carried out simultaneously with grafting and the mechanical properties can be altered in this way.

Apart from the above membranes, a further class of nonflourinated membranes obtained by sulphonation of high-temperature-stable thermoplastics has been developed. Thus, membranes composed of sulphonated polyether ketones (DE-A-4219077, WO 96/01177), sulphonated polysulphone (J. Membr. Sci. 83 (1993) p. 211) or sulphonated polyphenylene sulphide (DE-A-19527435) are known. Ionomers prepared from sulphonated polyether ketones are described in WO 00/15691.

Furthermore, acid-base blend membranes produced by mixing sulphonated polymers and basic polymers as described in DE-A-19817374 or WO 01/18894 are known.

To set the ion-exchange capacity for optimal acid retention, a cation-exchange membrane known from the prior art can be mixed with a polymer bearing no acid groups or only a small amount of acid groups. Suitable polymers have been described above as blend components, with high-temperature-stable polymers being particularly preferred. The preparation and properties of cation-exchange membranes comprising sulphonated PEK and a) polysulphones (DE-A4422158), b) aromatic polyamides (DE-A-42445264) or c) polybenzimidazole (DE-A-19851498) have been described. As an alternative, the sulphonation conditions can be chosen so that a low degree of sulphonation results (DE-A-19959289).

Apart from the cation-exchange membranes mentioned in the prior art which are based on organic polymers, the cation-exchange material can also be made of organic-inorganic composite materials. Such composite materials are preferably prepared by means of the sol-gel process. As starting compounds, use is made of mixtures of metal alkoxides, in particular siloxanes. These mixtures have a high purity of the starting materials and a low viscosity. These liquid precursor mixtures can be applied to a substrate by means of known technologies, for example spraying or spin coating, to give very thin and uniformly covering layers. Hydrolysis and condensation of the precursor mixtures then enables solid films to be produced on the surface. To obtain proton conductivity, the organic radicals of the alkoxides contain acid-containing groups, in particuar sulphonic acid groups.

The precursor mixtures can likewise contain functional organic groups which effect crosslinking of the layer formed and thus a further reduction in the permeability to the mineral acid and the fuels. Crosslinking can be carried out after layer formation either thermally or by irradiation (electron beam, UV, IR, NIR) or by means of an initiator.

The production of such a composite material is described, for example in Electrochimica Acta volume 37, year 1992, pages 1615-1618. Furthermore, such composite materials are known from G. W. Scherer, C. J. Brinker, Sol-Gel-Science, Academic Press, Boston, 1990.

One group of preferred compounds can be represented by the formula (A)

$$(RO)_y(R^1)_z M\text{-}X_a \quad \text{(A)}$$

where
y is 1, 2 or 3, preferably 3,
z is 0 or 1, preferably 0 and
a is 1 or 2, preferably 1, and
R and $R^1$ are each, independently of one another, hydrogen, a linear or branched alkyl, alkenyl, cycloalkyl or cycloalkenyl radical having from 1 to 20, preferably from 1 to 8, carbon atoms, or an aromatic or heteroaromatic group having from 5 to 20 carbon atoms,
M is an element selected from among Si, Zr, Ti, preferably Si, and the radicals X are each, independently of one another, a linear or branched alkylene or cycloalkylene group having from 1 to 20, preferably from 1 to 8, carbon atoms or an aromatic or heteroaromatic group having from 5 to 20 carbon atoms and bearing at least one sulphonic acid or phosphonic acid.

The radicals R, $R^1$ and X can have further substituents, in particular halogens such as fluorine atoms. The group X is preferably a radical of one of the formulae $Ph-SO_3H$, $C_nH_{2n}-SO_3H$, $C_nF_{2n}-SO_3H$ dar, where Ph is phenyl and n is an integer from 1 to 20. The group R is preferably a radical of the formula $C_nH_{2n+1}$, where n is from 1 to 3.

Preferred compounds are, in particular, hydroxysilyl acids, which are known per se and are described, for example, in DE 100 61 920, EP 0 771 589, EP 0 765 897 and EP 0 582 879.

Preferred hydroxysilyl acids can be represented by the formula B or C

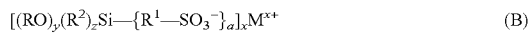

$$[(RO)_y(R^2)_zSi-\{R^1-SO_3^-\}_a]_xM^{x+} \qquad (B)$$

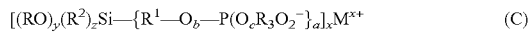

$$[(RO)_y(R^2)_zSi-\{R^1-O_b-P(O_cR_3O_2^-)_a\}]_xM^{x+} \qquad (C)$$

where M is $H^+$, $NH_4^+$ or a metal cation having a valence x of from 1 to 4, and y=1 to 3, z=0 to 2 and a=1 to 3, with the proviso that y+z=4−a, b and c are 0 or 1, R and $R^2$ are identical or different and are each methyl, ethyl, propyl, butyl radicals or H and $R^3$ is M or a methyl, ethyl, propyl, butyl radical, and $R^1$ is a linear or branched alkyl or alkylene group having from 1 to 12 carbon atoms, a cycloalkyl group having from 5 to 8 carbon atoms or a unit of one of the general formulae

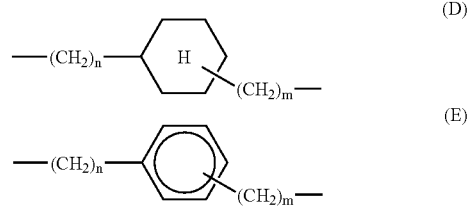

where n and m are each a number from 0 to 6.

Preferred hydroxysilyl acids or precursors (derivatives) thereof are trihydroxysilylethylsulphonic acid, trihydroxysilylphenylsulphonic acid, trihydroxysilylpropylsulphonic acid, trihydroxysilylpropylmethylphosphonic acid and dihydroxysilylpropylsulphonic diacid or salts thereof.

The structure of cation-exchange material can be set precisely by appropriate choice of trihydroxysilyl acid (network former), dihydroxysilyl acid (chain former) and monohydroxysilyl acid (chain end) and by addition of further sol formers. Suitable sol formers are, for example, the hydrolyzed precursors of $SiO_2$, $Al_2O_3$, $P_2O_5$, $TiO_2$ or $ZrO_2$. Preferred compounds include, inter alia, tetramethoxysilane, tetraethoxysilane, triethoxyvinylsilane, trimethoxyvinylsilane, triethoxypropenylsilane and trimethoxypropenylsilane.

As substrates for the deposition of the barrier layer, it is possible to use either a film of the basic polymer, a polymer electrolyte membrane doped with mineral acid or an electrode coated with noble metal catalyst.

In one variant of the invention, the barrier layer is deposited on an electrode.

According to a particular aspect of the present invention, the material from which the barrier layer is produced is chemically compatible with the sheet-like material doped with at least one mineral acid, so that good adhesion of the barrier layer to the sheet-like material is achieved. Accordingly, when a polyazole film is used, particular preference is given to using organic cation-exchange polymers to which the abovementioned polyazoles have good adhesion. Such polymers include, in particular, sulphonated polysulphones, polyether ketones and other polymers which have aromatic groups in the main chain. When inorganic materials are used, good adhesion to the organic or inorganic supports can be achieved by choice of appropriate functional groups.

When inorganic sheet-like materials are used, preference is accordingly given to using the abovementioned inorganic layers which can be obtained, for example, by hydrolysis of hydroxysilyl acids.

The multilayer electrolyte membranes of the invention display, taking into account the barrier layer, excellent conductivity and performance.

The proton conductivity of preferred multilayer electrolyte membranes at temperatures of 120° C. is preferably at least 0.1 S/cm, in particular at least 0.11 S/cm, particularly preferably at least 0.12 S/cm. This conductivity is also achieved at temperatures of 80° C.

A membrane according to the invention can be moistened at low temperatures. For this purpose, for example, the compound used as energy source, for example hydrogen, can be provided with a proportion of water. However, the water formed by the reaction is in many cases sufficient to achieve moistening.

The specific conductivity is measured by means of impedance spectroscopy in a 4-pole arrangement in the potentiostatic mode using platinum electrodes (wire, 0.25 mm diameter). The distance between the current-collecting electrodes is 2 cm. The spectrum obtained is evaluated using a simple model consisting of a parallel arrangement of an ohmic resistance and a capacitor. The specimen cross section of the membrane doped with phosphoric acid is measured immediately before mounting of the specimen. To measure the temperature dependence, the measurement cell is brought to the desired temperature in an oven and the temperature is regulated by means of a Pt-100 resistance thermometer positioned in the immediate vicinity of the specimen. After the temperature has been reached, the specimen is maintained at this temperature for 10 minutes before the start of the measurement.

The polymer membrane of the invention displays improved materials properties compared to the previously known doped polymer membranes. Owing to the low methanol permeability, the multilayer membranes can be used, in particular, in direct methanol fuel cells.

The crossover current density in a liquid direct methanol fuel cell operated at 90° C. using 0.5 M methanol solution is preferably less than 100 mA/cm², in particular less than 70 mA/cm², particularly preferably less than 50 mA/cm² and very particularly preferably less than 10 mA/cm². The crossover current density in a gaseous direct methanol fuel cell operated at 160° C. using 2 M methanol solution is preferably less than 100 mA/cm², in particular less than 50 mA/cm², very particularly preferably less than 10 mA/cm².

To determine the crossover current density, the amount of carbon dioxide liberated at the cathode is measured by means of a $CO_2$ sensor. The crossover current density is calculated from the measured value of the amount of $CO_2$, as described by P. Zelenay, S. C. Thomas, S. Gottesfeld in S. Gottesfeld, T. F. Fuller "Proton Conducting Membrane Fuel Cells II" ECS Proc. Vol. 98-27 pp. 300-308.

The invention further provides for the preferred use of the multilayer electrolyte membrane of the invention or the coated electrode in a membrane-electrode unit (MEU) for a fuel cell.

The MEU comprises at least one multilayer electrolyte membrane according to the invention and two electrodes between which the multilayer electrolyte membrane is located in a sandwich-like arrangement.

The electrodes each have a catalytically active layer and a gas diffusion layer for bringing a reaction gas to the catalytically active layer. The gas diffusion layer is porous so that reactive gas can pass through it.

The multilayer electrolyte membrane of the invention can be used as electrolyte membrane in electrochemical processes. In addition, it is possible to produce the electrolyte membrane or an intermediate structure for an MEU with one or both catalytically active layers. Furthermore, the MEU can also be produced by fixing the gas diffusion layer to the intermediate structure.

The present invention further provides a fuel cell system comprising a plurality of different MEUs of which at least one contains a multilayer membrane according to the invention.

A membrane-electrode unit according to the invention displays a surprisingly high power density. In a particular embodiment, preferred membrane-electrode units produce a current density of at least 0.1 A/cm$^2$, preferably 0.2 A/cm$^2$, particularly preferably 0.3 A/cm$^2$. This current density is measured in operation using pure hydrogen at the anode and air (about 20% by volume of oxygen, about 80% by volume of nitrogen) at the cathode at atmospheric pressure (1013 mbar absolute, with open cell outlet) and a cell voltage of 0.6 V. Here, particularly high temperatures in the range 150-200° C., preferably 160-180° C., in particular 170° C., can be used.

The power densities mentioned above can also be achieved at a low stoichiometry of the fuel gases on both sides. According to a particular aspect of the present invention, the stoichiometry is less than or equal to 2, preferably less than or equal to 1.5, very particularly preferably less than or equal to 1.2.

EXAMPLES 1 to 6

Production of Cation-Exchange Membranes:

To produce cation-exchange membranes, the following stock solutions were prepared.
a) 10 wt % of PES (Ultrason E 7020 P) in NMP
b) 17 wt % of sPEK (degree of sulphonation: 50.3%) in NMP The solutions were mixed in the ratios indicated in Table 1 and applied by means of a doctor blade coater (50 μm). The films were subsequently dried in an oven at 120° C. for 11 hours. The thickness of the films produced is 20-25 μm. The polymers used for producing the membrane are shown in Table 1.

TABLE 1

|  | PES [% by weight] | sPEK [% by weight] |
| --- | --- | --- |
| Example 1 | 0 | 100 |
| Example 2 | 20 | 80 |
| Example 3 | 30 | 70 |
| Example 4 | 40 | 60 |
| Example 5 | 50 | 50 |
| Example 6 | 60 | 40 |

The specific conductivity is measured by means of impedance spectroscopy in a 4-pole arrangement in the potentiostatic mode using platinum electrodes (wire, 0.25 mm diameter). The distance between the current-collecting electrodes is 2 cm. The spectrum obtained is evaluated using a simple model consisting of a parallel arrangement of an ohmic resistance and a capacitor. The specimen cross section of the sulphonated PEK membranes and sulphonated PEK blend membranes is measured after swelling in water at 80° C. for 1 hour prior to mounting of the specimen. To measure the temperature dependence and for moistening, the measurement cell is rinsed with heated water. Before commencement of the experiment, the cell is maintained at 80° C. for 30 minutes and the conductivity measurement is then commenced. Cooling is carried out at 1 K/min. Before the start of each new measurement, the desired temperature is then maintained for 10 minutes.

Table 2 shows the results of the conductivity measurements on sulphonated PEK membranes and sulphonated PEK blend membranes.

TABLE 2

Conductivity values of sulphonated PEK membranes and sulphonated PEK blend membranes (proportion of PES blend component in per cent by weight) for use as barrier layer for phosphoric acid

| T (° C.) | Ex. 1 | Ex. 2 | Ex. 3 | Ex. 4 | Ex. 5 | Ex. 6 |
| --- | --- | --- | --- | --- | --- | --- |
| 80 | 0.196 | 0.160 | 0.150 | 0.149 | 0.046 | 0.035 |
| 70 | 0.181 | 0.148 | 0.139 | 0.137 | 0.042 | 0.031 |
| 60 | 0.164 | 0.136 | 0.125 | 0.125 | 0.037 | 0.028 |
| 50 | 0.150 | 0.124 | 0.113 | 0.112 | 0.032 | 0.025 |
| 40 | 0.133 | 0.110 | 0.099 | 0.098 | 0.027 | 0.022 |
| 30 | 0.116 | 0.096 | 0.086 | 0.085 | 0.023 | 0.018 |
| 22 | 0.105 | 0.086 | 0.077 | 0.074 | 0.020 | 0.016 |

The conductivity and barrier action of the cation-exchange membrane for phosphoric acid depend strongly on the content of acid groups expressed by the ion-exchange capacity (IEC).

To measure the IEC, the sulphonated polymer or the sulphonated blend membrane is firstly treated in boiling water for 2 hours. Excess water is subsequently dabbed off and the specimen is dried at 160° C. in a vacuum drying oven at p<1 mbar for 15 hours. The dry weight of the membrane is then determined. The polymer which has been dried in this way is then dissolved in DMSO at 80° C. for 1 hour. The solution is subsequently titrated with 0.1 M NaOH. The ion-exchange capacity (IEC) is then calculated from the consumption of the acid to the equivalence point and the dry weight.

To determine the swelling behaviour, the sulphonated membranes or blend membranes are swollen at 80° C. for 2 hours and the increase in area is determined.

Table 3 shows the ion-exchange capacity of a sulphonated PEK membrane (0% of PES) and blend membranes of sulphonated PEK and various contents of PES.

TABLE 3

Ion-exchange capacity and swelling at 80° C. of a sulphonated PEK membrane (0% of PES) and blend membranes of sulphonated PEK and various contents of PES

|  | IEC (meq/g) | T = 80° C. Swelling (%) |
| --- | --- | --- |
| Example 1 | 2.06 | 156 |
| Example 2 | 1.71 | 124.6 |
| Example 3 | 1.34 | 61.6 |
| Example 4 | 1.03 | 41.7 |
| Example 5 | 0.8 | 8.6 |
| Example 6 | 0.59 | 2 |

To measure the barrier action of the cation-exchange membranes for the example of membranes doped with phosphoric acid, the following procedure is employed:

A cation-exchange membrane having a diameter of 7 cm in the dry state is firstly stamped out. This membrane is subsequently dipped into 300 ml of water and the pH change is measured as a function of time. In the case of these membranes, the pH can, owing to the material selected, decrease because of residues of free acid from the sulphonation reaction. Since each membrane has a different content of acid groups, this blank has to be measured for each individual membrane.

Figure 2:
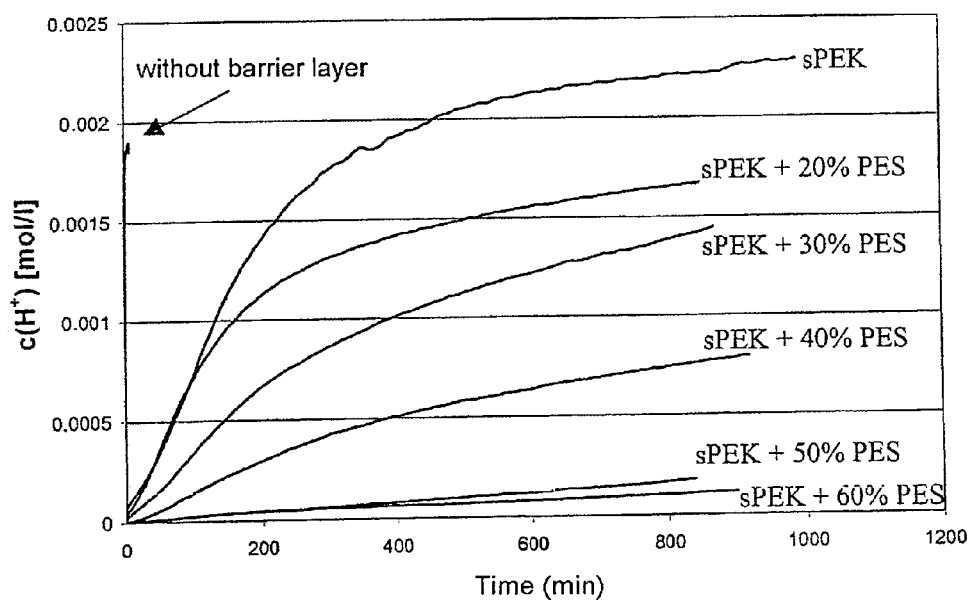
FIG. 2 is a plot of the values of pH as a function of time for different cation-exchange

Such a membrane is subsequently clamped into the measurement apparatus again and an acid-doped membrane is placed on top. To carry out doping, a PBI film having an initial thickness of 50 μm is placed in 85% phosphoric acid for at least 72 hours at room temperature. A piece of this acid-doped membrane having a diameter of 3 cm is stamped out and immediately laid on the cation-exchange membrane. The sandwich produced in this way is then placed in a glass beaker filled with 300 ml of water and the pH change is measured over 15 hours at room temperature (20° C.). A schematic structure of the measurement apparatus is shown in FIG. 1. The result obtained in this way is shown graphically in FIG. 2.

Figure 3:
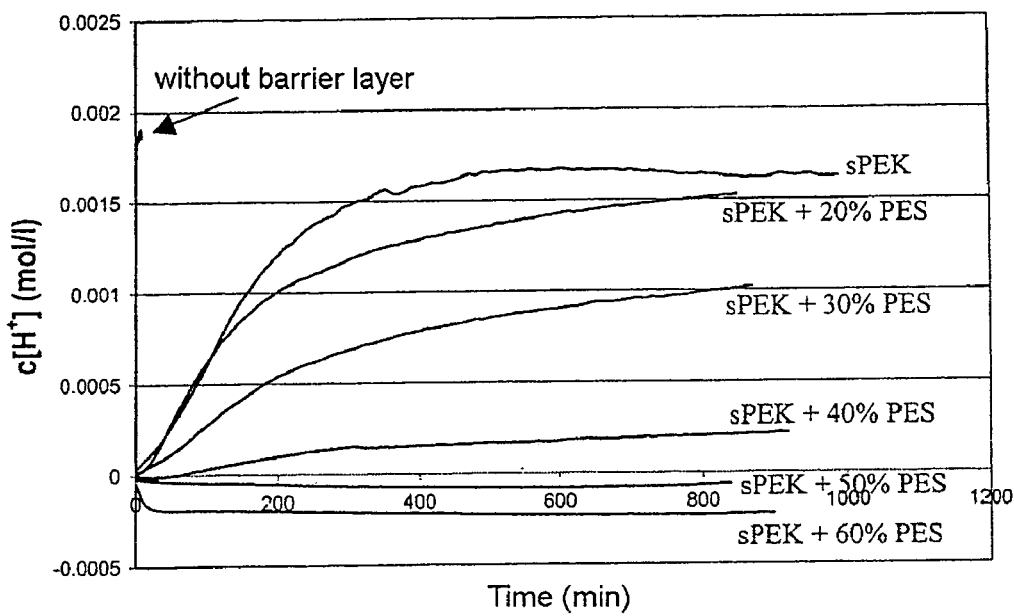
FIG. 3 is a plot of the values of pH as a function of time for different cation-exchange membranes, corrected for the blank.

The negative values in FIG. 3 after correction of the blank can be explained by the loss of acid from the cation-exchange membrane (blank) itself being greater than the passage of phosphoric acid through the cation-exchange membrane.

Figure 4:
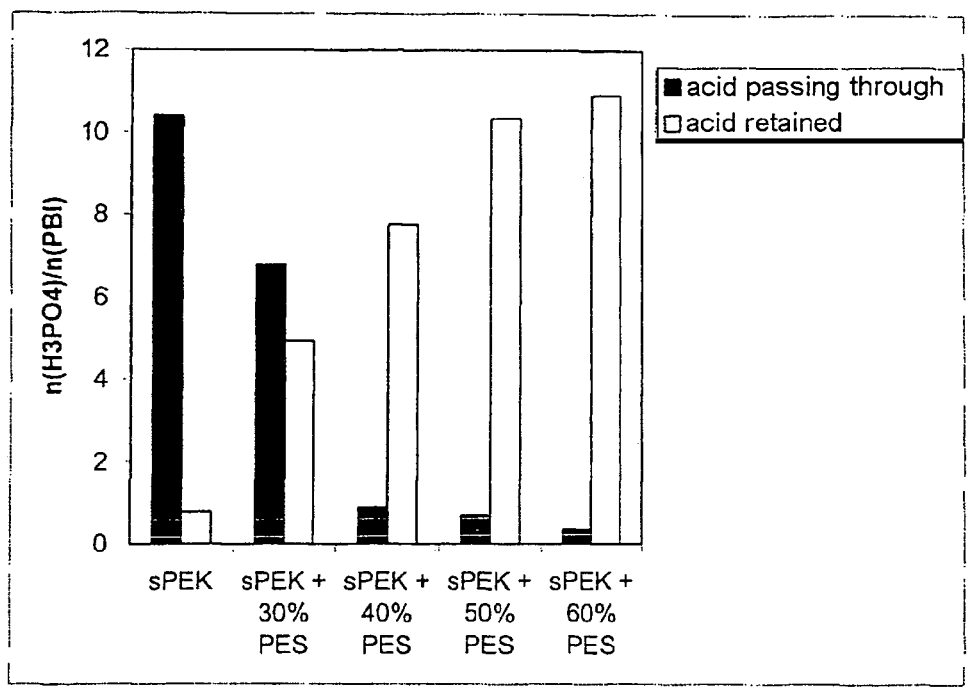
FIG. 4 is a bar plot of the amounts of acid which passed through the barrier layer and which was retained by the barrier layers of different cation-exchange membranes.

In FIG. 4, the measurement of the amount of acid which has passed through the barrier layer and that which has been retained by the barrier layer is demonstrated beyond doubt.

The results demonstrate that the use of cation-exchange materials as barrier layer leads to a surprisingly clear reduction in the liberation of mineral acid.

It can, surprisingly, be seen from the results obtained that preferred cation-exchange membranes according to the invention in the moistened state at 80° C. display a conductivity of <0.06 S/cm, in particular <0.05 S/cm.

Preferred cation-exchange membranes according to the invention have an IEC value of less than 0.9 meq/g. The swelling of preferred cation-exchange membranes is less than 20% at 80° C.

It has surprisingly been found that the use of the membrane of the invention, i.e. the membrane provided with a barrier layer, having an ion-exchange capacity of less than 0.9 meq/g and a swelling in water of less than 10% at 80° C. leads to a particularly significant reduction in the passage of phosphoric acid and the acid concentration does not go above 0.0005 mol/l over a period of 15 hours.

EXAMPLE 7

Production of an Ultrathin Cation-Exchange Membrane as Barrier Layer on the Membrane Surface:

Production of PBI Film:

A 50 μm thick film of a 15% strength by weight polybenzimidazole (PBI) solution in DMAc was spread by means of a doctor blade and dried at 120° C. in an oven for 12 hours.

Preparation of the Spray Solution:

A 10% strength by weight solution of PES (Ultrason E 7020) and sPEK (degree of sulphonation: 50.3%) in DMAc was prepared, with the weight ratio of PES to sPEK being 60:40.

Coating:

To apply the coating, a glass plate was placed on a hotplate and heated to 150° C. After this temperature had been reached, the PBI film was laid on the glass plate. As soon as the film had drawn flat onto the glass plate, a metal template was placed on top. The spray solution was sprayed onto the film surface a number of times by means of an airbrush. The solvent was evaporated after each spraying step. The metal template was then taken off and the sprayed region was cut out. The thickness of the coating was 4-5 μm.

The coated polyazole film is clamped in place with the coated side uppermost as shown in FIG. 1 and then dipped into a glass beaker filled with 100 ml of water. In this configuration, the underside is in contact with water while 0.5 ml of phosphoric acid is applied to the opposite side.

The change in the pH was observed over a period of 50 hours. For comparison, a polyazole film without a barrier layer was subjected to the same test.

Figure 5:
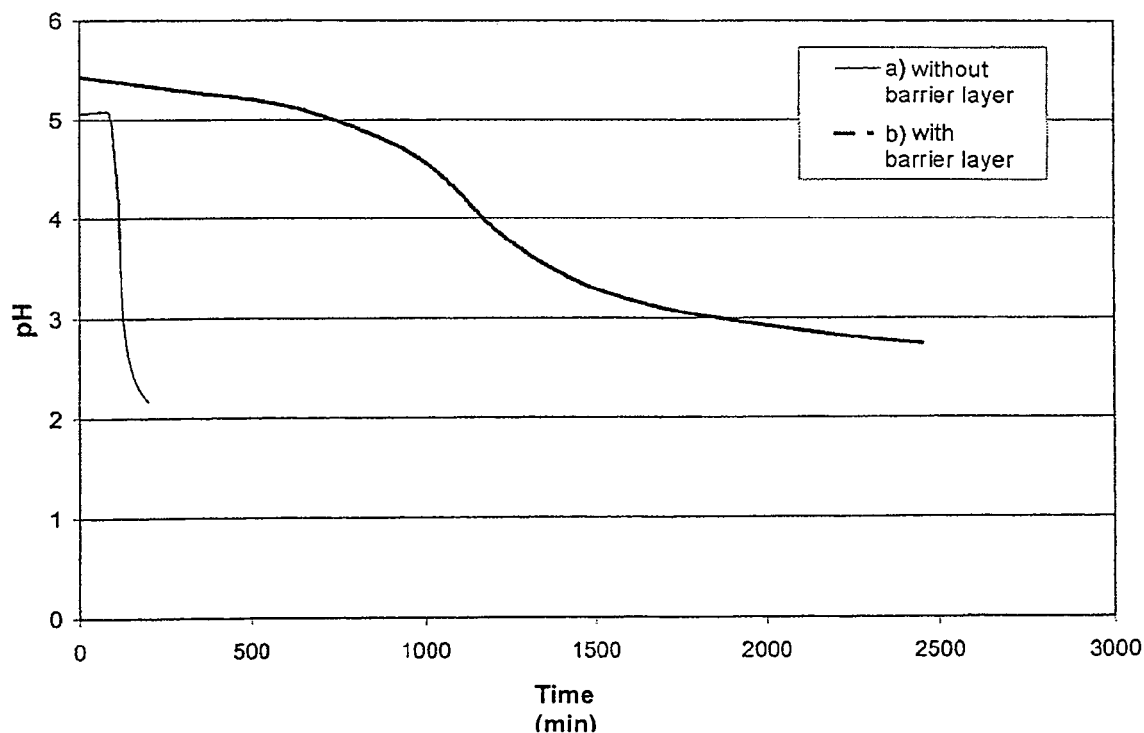
FIG. 5 is a plot showing the values of pH of a volume of water as a function of time, demonstrating effectiveness of a barrier layer in an experimental setup shown in FIG. 1.

The results obtained are shown in FIG. 5, and the effectiveness of the thin barrier layer can clearly be seen.

The invention claimed is:

1. A multilayer proton-conducting electrolyte membrane comprising:
   a) a sheet-like material doped with one or more mineral acids, and
   b) at least one barrier layer which covers at least one of the two surfaces of the sheet-like material,
   wherein the multilayer electrolyte membrane has proton conductivity of at least 0.1 S/cm at 120° C.

2. The electrolyte membrane of claim 1, wherein the sheet-like material comprises a material selected from the group consisting of a basic polymer, a mixture of one or more basic polymers with other polymers, and a chemically inert support.

3. The electrolyte membrane of claim 2, characterized in that the basic polymer has at least one nitrogen atom in a repeating unit.

4. The electrolyte membrane of claim 2, characterized in that the basic polymer contains at least one aromatic ring having at least one nitrogen atom.

5. The electrolyte membrane of claim 4, characterized in that the basic polymer is a polyimidazole, a polybenzimidazole, a polybenzothiazole, a polybenzoxazole, a polytriazole, a polyoxadiazole, a polythiadiazole, a polypyrazole, a polyquinoxaline, a poly(pyridine), a poly(pyrimidine), or a poly(tetrazapyrene).

6. The electrolyte membrane of claim 2, characterized in that a mixture of one or more basic polymers with a further polymer is used.

7. The electrolyte membrane of claim 1, characterized in that the mineral acid is phosphoric acid or sulphuric acid.

8. The electrolyte membrane of claim 1, characterized in that the barrier layer is a cation-exchange material.

9. The electrolyte membrane of claim 8, characterized in that the cation-exchange material has an ion-exchange capacity (IEC) of less than 0.9 meq/g.

10. The electrolyte membrane of claim 8, characterized in that the cation-exchange material has an area swelling in water at 80° C. of less than 20%.

11. The electrolyte membrane of claim 8, characterized in that the cation-exchange material has a conductivity of less than 0.06 S/cm at 80° C. in a moistened state.

12. The electrolyte membrane of claim 1, characterized in that the barrier layer has a thickness of from 10 to 30 μm.

13. The electrolyte membrane of claim 1, characterized in that the barrier layer has a thickness of less than 10 μm.

14. The electrolyte membrane of claim, characterized in that the barrier layer applied on a cathode side is thicker than the barrier layer located on an anode side.

15. The electrolyte membrane of claim 1, characterized in that the barrier layer is a cation-exchange material based on an organic polymer or an organic-inorganic composite material having covalently bound acid groups selected from the group consisting of carboxylic acids, sulphonic acids, and phosphonic acids.

16. A multilayer proton-conducting electrolyte membrane comprising:
 a) a sheet-like material doped with one or more mineral acids, and
 b) at least one barrier layer which covers at least one of the two surfaces of the sheet-like material, said barrier layer comprising a cation-exchange material,
 wherein the multilayer electrolyte membrane has proton conductivity of at least 0.1 S/cm at 120° C.

* * * * *

UNITED STATES PATENT AND TRADEMARK OFFICE
CERTIFICATE OF CORRECTION

PATENT NO. : 7,625,652 B2 Page 1 of 1
APPLICATION NO. : 10/512264
DATED : December 1, 2009
INVENTOR(S) : Uensal et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1279 days.

Signed and Sealed this

Twenty-first Day of December, 2010

David J. Kappos
*Director of the United States Patent and Trademark Office*